J. H. ZIMMERMANN.
MAGNET SUPPORT FOR ELECTRICAL MEASURING INSTRUMENTS.
APPLICATION FILED NOV. 4, 1905.
921,054.
Patented May 11, 1909.
2 SHEETS—SHEET 2.
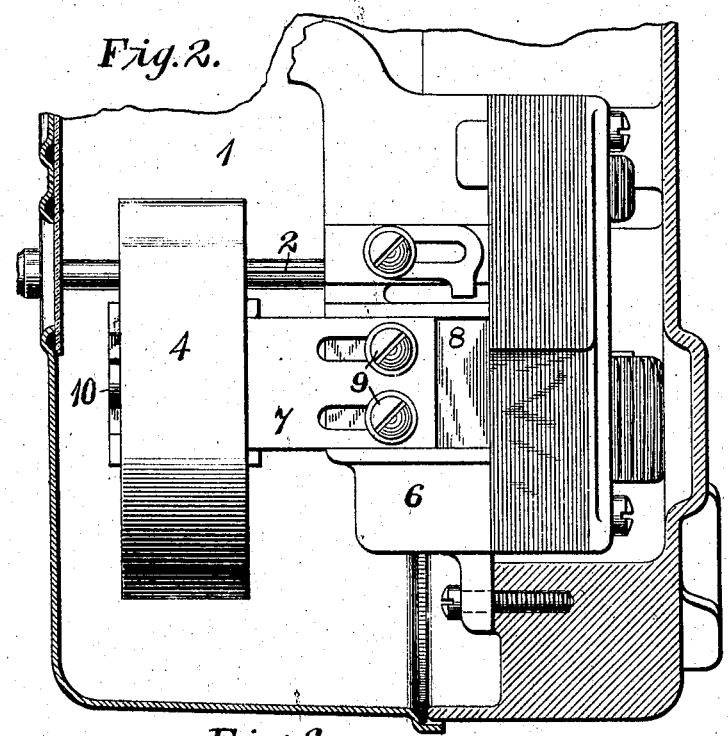
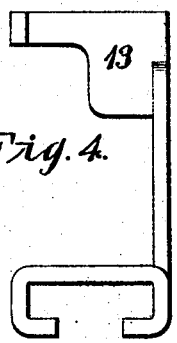
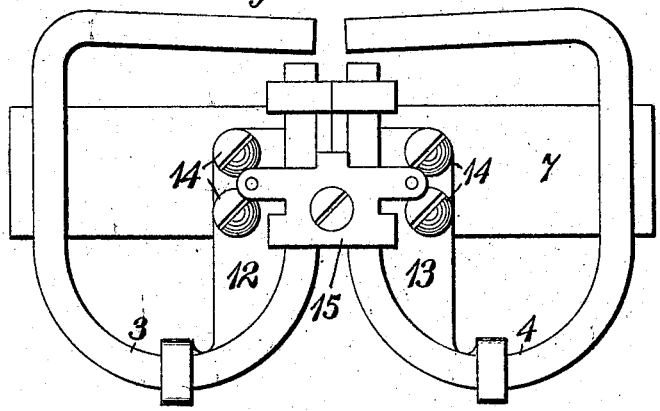
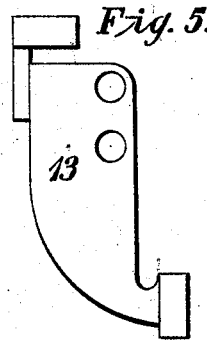
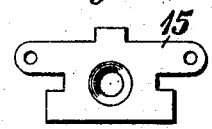
WITNESSES:
Fred. H. Miller
R. J. Dearborn
INVENTOR
John H. Zimmermann
BY
Kesley E. Carr
ATTORNEY

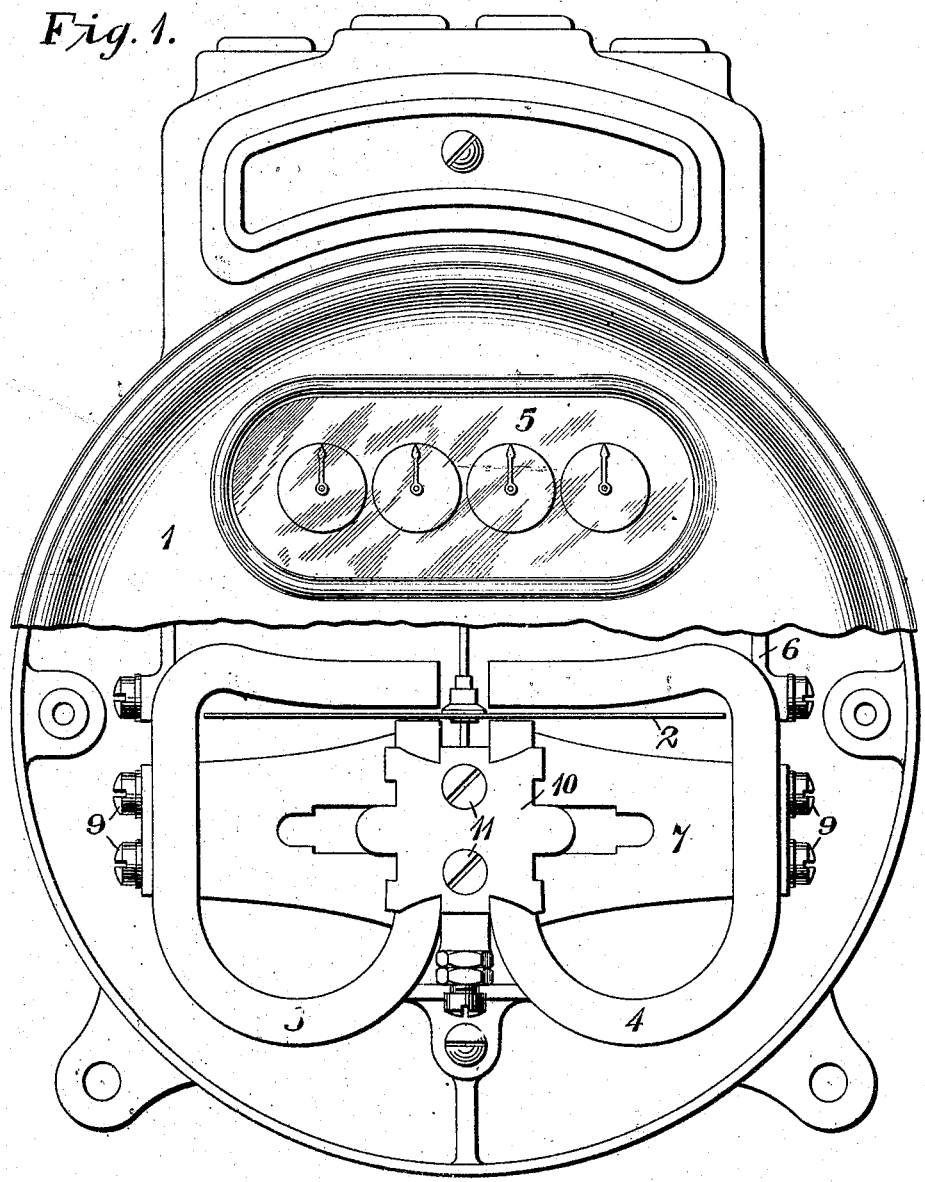

UNITED STATES PATENT OFFICE.

JOHN H. ZIMMERMANN, OF WILKINSBURG, PENNSYLVANIA, ASSIGNOR TO WESTINGHOUSE ELECTRIC & MANUFACTURING COMPANY, A CORPORATION OF PENNSYLVANIA.

MAGNET-SUPPORT FOR ELECTRICAL MEASURING INSTRUMENTS.

No. 921,054.   Specification of Letters Patent.   Patented May 11, 1909.

Application filed November 4, 1905. Serial No. 285,861.

*To all whom it may concern:*

Be it known that I, JOHN H. ZIMMERMANN, a citizen of the United States, and a resident of Wilkinsburg, in the county of Allegheny and State of Pennsylvania, have invented a new and useful Improvement in Magnet-Supports for Electrical Measuring Instruments, of which the following is a specification.

My invention relates to electrical measuring instruments and has special reference to such instruments as are provided with rotatable disks and coöperating damping magnets.

The object of my invention is to provide means for supporting a plurality of permanent damping magnets in electrical instruments which shall be simple in construction and which shall permit of an adjustment of the magnets in a plane parallel to the plane of the disk upon which the magnets act.

In electrical measuring instruments which are provided with rotatable disks, it is advisable, in order to regulate the speed of the rotating member, to provide one or more damping magnets which shall be so assembled with respect to the disk as to cause it to rotate in the magnetic field set up by the magnets. In accordance with my present invention, I employ two magnets, by means of which a relatively wide air-gap may be provided for the operation of the disk, and I mount the magnets in invariable relation to each other and provide means for adjusting them as a unit in a plane parallel to the disk, in order to facilitate calibration of the instrument.

In the accompanying drawings, Figure 1 is a front elevation of an electrical measuring instrument having a magnet support constructed in accordance with my invention, a portion of the cover being removed. Fig. 2 is a side elevation of a portion of the instrument shown in Fig. 1, and Figs. 3, 4, 5, 6 and 7 are detail views of a modified form of magnet support.

Referring to the drawings, an electrical measuring instrument 1 comprises a rotatably mounted disk 2, a plurality of damping magnets 3 and 4 therefor and a registering dial 5 of any well known construction, all of which are supported by a frame 6 that is mounted upon the back-plate of the instrument. The magnets 3 and 4 are rigidly attached to a strip or cross-piece 7, the ends of which are bent at right-angles to the body portion and engage suitable recesses 8 in the frame 6. The cross-piece 7 is fastened to the frame by means of a plurality of clamping screws 9 which engage slots in its ends. This construction provides for the adjustment of the cross-piece, since its supporting ends may slide in the recesses 8 and be clamped at any point therein by the screws 9. The center lines of the recesses 8 are parallel to the plane of rotation of the disk 2, and since the magnets 3 and 4 are so mounted upon the cross-piece 7 that the disk maintains a position substantially in the center of their air-gaps, any adjustment of the cross-piece in the recesses 8 serves merely to vary the strength of the field in which the disk rotates. The position of the two magnets relative to each other and to the cross-piece 7 is maintained by a supporting bracket 10, which engages one arm of each magnet and is fastened to the cross-piece by means of a plurality of clamping bolts 11.

Referring now to Figs. 3, 4, 5, 6 and 7, which disclose a modified form of support, a pair of corresponding magnet-engaging brackets 12 and 13 are clamped upon the strip 7 by binding screws 14 and serve, in combination with a spacing bracket 15, which is clamped to the strip 7 upon and between the magnets 3 and 4, to hold the magnets in position, the brackets 12, 13 and 15 being provided with lateral projections which engage the arms of the magnets.

Variations in size, form and arrangement of details may be made within the scope of my invention, and although I have shown a magnet support applied to a specific type of instrument, this improvement may obviously be applied to any other suitable type of instrument.

I claim as my invention:

1. In an electrical measuring instrument, the combination with a frame having side channels, a rotatably mounted disk and a plurality of damping magnets disposed end to end, of means for adjustably supporting said magnets, said means comprising a strip having lateral projections that engage the channels in the instrument frame, and means for suitably fastening the magnets to said strip.

2. In an electrical measuring instrument, the combination with a frame having side channels, a plurality of damping permanent magnets disposed end to end and having their air-gaps in a single plane and a disk rotatably mounted in said air-gaps, of means for simultaneously adjusting said magnets in a plane parallel to the plane of rotation of the disk, said means comprising a strip having lateral projections that engage the channels in the instrument frame, and means for suitably fastening the magnets to said strip.

3. In an electrical measuring instrument, the combination with a frame having side channels, a rotatably mounted disk and a plurality of damping magnets disposed end to end, of means for so supporting said magnets that they are relatively fixed and are adjustable in a plane parallel to the plane of rotation of the disk, said means comprising a strip having lateral projections which engage the channels in the instrument frame, and means for suitably fastening the magnets to said strip.

4. In an electrical measuring instrument, the combination with a frame having recesses, a rotatably mounted disk and a plurality of damping magnets therefor, of means for adjustably supporting said magnets, said means comprising a strip provided with lateral projections to engage the recesses in the instrument frame, and a binding bracket which engages said magnets and is attached by binding screws to the strip.

5. In an electrical measuring instrument, the combination with a frame having recesses, a plurality of damping permanent magnets having their air-gaps in a single plane and a disk rotatably mounted in said air-gaps, of means for simultaneously adjusting said magnets in a plane parallel to the plane of rotation of the disk, said means comprising a strip having lateral projections which engage the recesses in the instrument frame, and a binding bracket which engages said magnets and is attached by binding screws to the strip.

6. In an electrical measuring instrument, the combination with a frame having recesses, a rotatably mounted disk and a plurality of damping magnets therefor, of means for so supporting said magnets that they are relatively fixed and are adjustable in a plane parallel to the plane of rotation of the disk, said means comprising a strip having lateral projections which engage the recesses in the instrument frame, and a binding bracket which engages said magnets and is attached by binding screws to the strip.

In testimony whereof, I have hereunto subscribed my name this 21st day of October 1905.

JOHN H. ZIMMERMANN.

Witnesses:
C. R. ROTHWELL,
BIRNEY HINES.